3,194,788
COPOLYMERIZATION OF TRIOXAN WITH DIETHYLENE GLYCOL FORMAL AND RESULTING PRODUCT
Klaus Küllmar, Edgar Fischer, and Klaus Weissermel, all of Frankfurt am Main, Germany, assignors to Farbwerke Hoechst Aktiengesellschaft vormals Meister Lucius & Brüning, Frankfurt am Main, Germany, a corporation of Germany
No Drawing. Filed June 1, 1960, Ser. No. 33,087
Claims priority, application Germany, June 9, 1959, F 28,645
10 Claims. (Cl. 260—67)

The present invention relates to a process for making copolymers of cyclic acetals and more especially it relates to a process for making copolymers of trioxan with diethylene glycol formal.

It is known that cyclic acetals, especially trioxan, can be polymerized in the presence of a cationically active catalyst and in the presence or absence of an inert organic solvent, whereby thermoplastic polyacetals of high molecular weight are obtained.

The polyacetals so obtained, which may differ very much with regard to their molecular weight cannot be processed in their thermoplastic state under the working conditions selected without considerable decomposition, which is generally accompanied by evolution of gas.

In order to meet this requirement, the polyacetals are often admixed prior to being processed with a thermal stabilizer, i.e., a compound which is added to increase the thermostability of those polyacetals, for example by blocking their terminal groups.

We have now found that cyclic acetals, especially trioxan, can be copolymerized with diethylene glycol formal in the presence or absence of an inert organic solvent and in the presence of a cationically active catalyst, whereby novel and interesting copolymers are obtained. It has also been found that diethylene glycol formal incorporated into the polyacetal, considerably improves the thermostability of said polyacetal and at the same time is able to regulate the molecular weight of the polymers.

The improved thermostability of trioxan-diethylene-glycol-formal copolymers as compared with that of pure trioxan homopolymers is most likely due to the different composition of the macromolecule. Trioxan homopolymers are obtained in the manner illustrated by the following general formulae

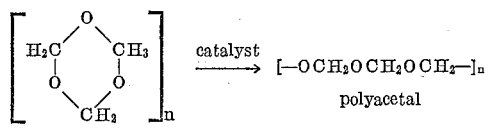

Trioxan diethylene glycol formal copolymers are made from the following structures

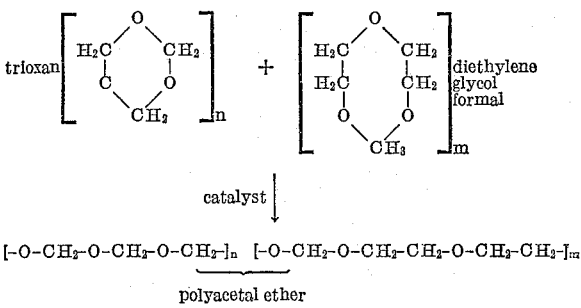

wherein $n$ and $m$ are integers and the sum of $n+m$ is greater than 2.

The composition of the resulting copolymers is determined by the ratio in which the monomers are used in the monomer mixture and by the reaction conditions selected in a given case.

The above formulae indicate that the polymerization of trioxan leads to a polyacetal whereas the copolymerization of trioxan-diethylene-glycol-formal leads to an acetal-ether-copolymer notwithstanding that under the reaction conditions selected an acetal polymerization is concerned in either case.

In the case of the copolymers, the stabilization of the polymer is probably the result of the incorporation of ether groupings in statistic distribution into the polyacetal macromolecule. It appears obvious that the macromolecule skeleton can be more effectively reinforced by the incorporation of ether groupings than by the subsequent stabilization of a polyacetal, which is substantially limited to blocking of the terminal groups.

Depending on the reaction conditions and the composition of the monomers the copolymerization of trioxan with diethylene glycol formal (defined hereinafter as "difo") which is carried out in the presence or absence of an inert organic solvent and in the presence of a cationically active catalyst, leads to products that include highly viscous oils or waxes of relatively low molecular weight and rigid thermoplastic copolymers of high molecular weight.

The thermostability of the polymers generally increases as does the content of difo whereas the crystallite melting point and the molecular weight decrease. Copolymers prepared from monomeric mixtures which contain up to about 50% by weight difo are of thermoplastic nature, while copolymers prepared from monomeric mixtures containing more than 50% by weight difo are of increasing waxy character. It is also interesting to note that a small proportion of difo, for example 1% by weight, in the monomeric mixture increases the thermostability of the copolymers obtained, while the average molecular weight of those copolymers is simultaneously reduced.

In other words, the molecular weight can be regulated not only by the polymerization conditions (temperature, catalyst concentration etc.) but also and this more effectively by the proportion in which difo is used.

The monomers used according to this invention for the manufacture of high molecular weight acetal copolymers, advantageously made from trioxan and difo, should be free from acid constituents which may initiate the splitting of the cyclic acetals. In addition thereto, the monomers should not contain impurities which disturb or influence the polymerization, for example water, methanol, formic acid, formaldehyde and acetal peroxide compounds. These compounds render the initiation of the polymerization more difficult or make the polymerization not reproducible. In other words, the optimum operation conditions have therefore to be determined in each case.

The monomers are advantageously purified by fractional distillation with the exclusion of air and moisture, if desired in the presence of triethyl aluminum.

As catalysts which can advantageously be used for the copolymerization of acetals, especially trioxan with difo, there may be mentioned more especially: Lewis acids, for example borontrifluoride, tin tetrachloride, antimony pentachloride or more especially the Lewis acids in the form of their known complex or salt-like compounds alone or in admixture with one another or in combination with a suitable co-catalyst yielding protons or carbenium ions, for example water, tert. butanol, acetic acid, halogenoacetic acids, benzyl chloride, benzyl bromide, benzotrichloride, benzoyl chloride, acetyl chloride. The co-catalysts are generally used in an equivalent proportion (calculated on the catalyst), although a smaller proportion of co-catalyst may also be used.

Borontrifluoride-etherates, for example borontrifluoride diethyletherate or borontrifluoride-tetrahydrofuranetheate, borontrifluoride amine complexes, for example borontrifluoride-diethylamine-complex compounds or borontrifluoride-diphenylamine complex compounds and also oxonium fluoroborates, for example triethyloxonium-fluoro-borate, and especially aryl-diazonium fluoroborates, are active catalysts in the polymerization of acetals.

Suitable aromatic aryl-diazonium fluoroborates are those, for example, which are wholly or partially soluble in the monomer mixture under the conditions selected for polymerization. Phenyl diazonium fluoroborates which carry one or more substituents in any desired position at the aromatic nucleus fulfil this requirement. Such substituents are more especially: alkyl groups, cycloalkyl groups, aryl groups, alkoxy groups, phenoxy groups, ester groups, halogen groups, perhalogenated alkyl groups, nitro groups, alkylsulfonyl groups, nitrile groups, sulfonamide groups, arylazo groups, etc.

Suitable diazonium fluoroborates can also be derived from aromatic parent substances, such as fluorene, carbazole and anthraquinone. The following compounds can, for example, be used as active catalysts in the copolymerization of cyclic acetals.

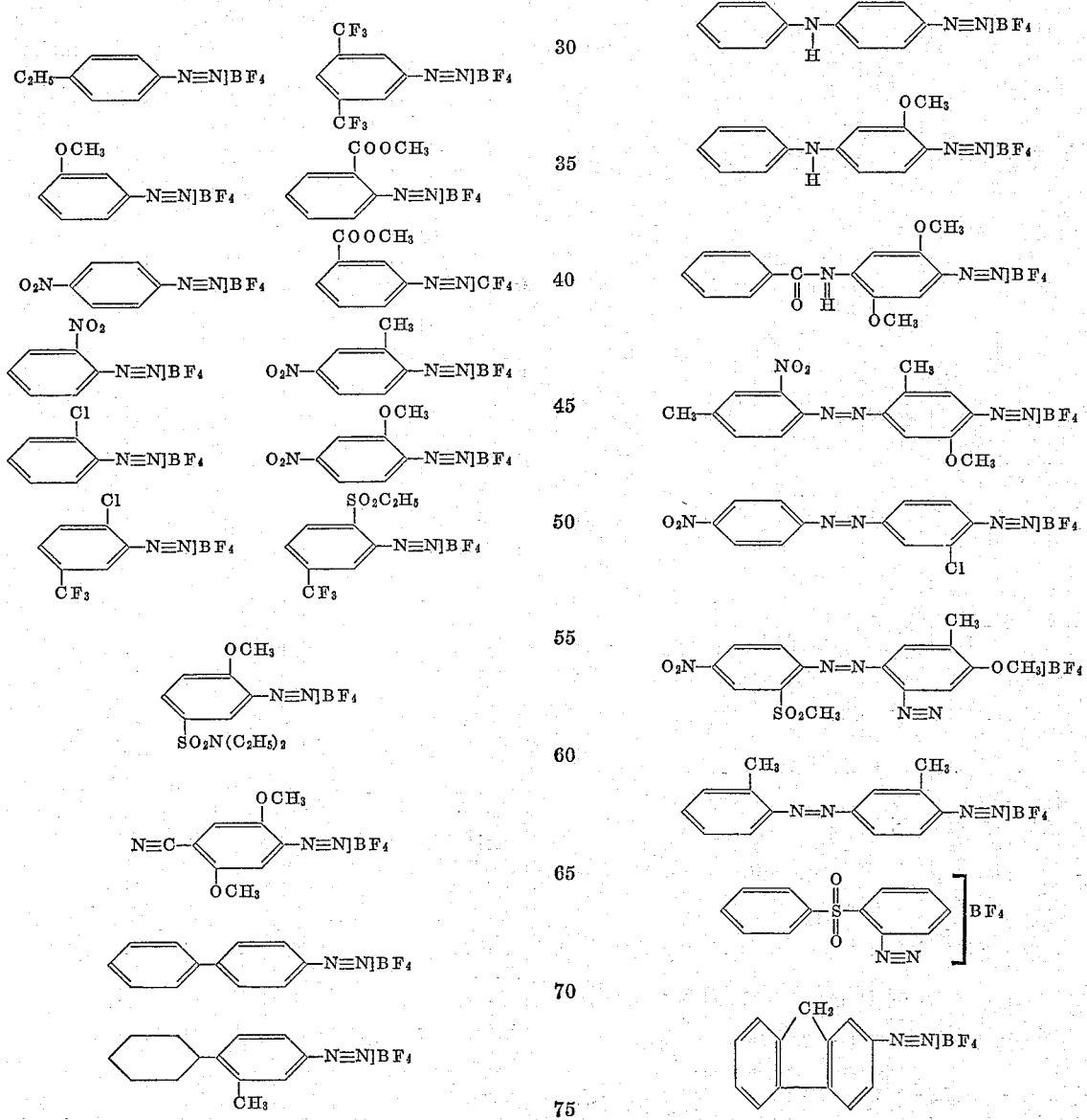

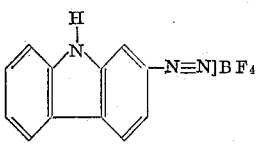

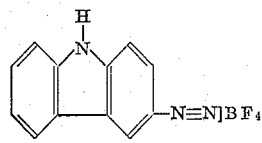

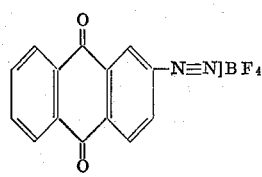

In view of the fact that the stability of the pure aryl diazonium fluoroborates depends substantially on their constitution, the catalyst or catalyst mixture is advantageously selected according to the reaction conditions used. Those aryldiazonium fluoroborates which already decompose at a lower temperature, for example at about 50° C., for instance,

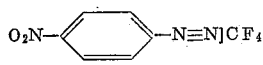

or

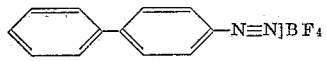

are advantageously used for low temperature polymerization, while more thermostable aryldiazonium fluoroborates

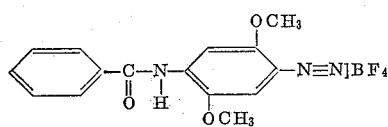

or

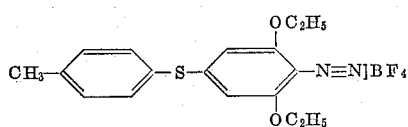

are advantageously used when the polymerization is carried out at a raised temperature, for example 100° C.

The proportion in which the polymerization activator is used may vary within wide limits. Traces of the aforesaid catalysts may already initiate the polymerization. When the catalyst is used in a concentration of, for example, about 0.0001 to about 5 mol percent, preferably 0.001 to about 4 mol percent, the polymerization proceeds with an industrially useful rate. The catalyst concentration necessary for substantial conversion of monomeric mixture into copolymer depends on the catalyst activity, the purity of the monomers used and the reaction conditions selected.

The copolymerization of cyclic acetals, especially of trioxan with difo, can be carried out by the bulk, solution or dispersion method. Bulk polymerization can be carried out at a temperature above or below the melting point of the monomeric mixture used as starting material. The solution polymerization is carried out in an inert organic solvent in which the monomeric mixture is wholly or partially soluble.

Suitable solvents are aromatic hydrocarbons, such as benzene or toluene, cycloaliphatic hydrocarbons such as cyclohexane, aliphatic saturated hydrocarbons which advantageously contain 3–10 carbon atoms, halogenated aliphatic hydrocarbons, such as ethyl chloride, methylene chloride, chloroform, carbon tetrachloride, hydrocarbons containing nitro-groups, such as nitromethane, nitroethane, and nitrobenzene. The solution of the monomeric mixture in these solvents should have a concentration of between 5 and 40% by weight, preferably 10 and 30% by weight.

The polymerization batch may also be admixed with substances which regulate the course of the polymerization, influence the properties of the end products, exhibit stabilizing and/or plasticizing properties and serve to incorporate terminal groups into the polymer.

The polymerization temperature depends on the kind of process used and may vary within wide limits. It is, however, advantageous to work at a temperature within the range of −100° C. to +150° C., preferably −70° C. to +120° C. Under otherwise identical conditions, the rate of polymerization decreases as does the temperature. In order to obtain the desired rate of polymerization the catalyst concentration has therefore to be increased with decreasing polymerization temperature.

The substantially crystalline copolymers obtained are advantageously purified by introducing them in finely distributed form into a benzene-methanol mixture which contains the more benzene the higher the proportion of difo. In this mixture, the copolymers are boiled under reflux and then dried in vacuo at 50–80° C. Alternatively, the copolymers may be dissolved at 120–150° C. in butyrolactone or in another high-boiling organic solvent, for example dimethyl formamide or dimethylsulfoxide. On cooling, the copolymers precipitate again and then they can be purified according to known methods.

Butyrolactone has proved especially favorable for measuring the viscosity of the copolymers obtained by this invention. The viscosity is determined at 140° C. in a 0.5% by weight solution of the copolymer in butyrolactone after addition of 2% by weight of diphenylamine, calculated on the solvent.

The copolymers obtained by the process of this invention have a very wide range of application. High molecular weight copolymers that can be processed in their thermoplastic state and have an $$\frac{\eta \text{ spec.}}{c.}$$

of between 0.5 and 2.0, advantageously between 0.7 and 1.5, can be made into foils, films, bands and other injection molded articles.

Waxy copolymers of low molecular weight, i.e. those copolymers which contain a high proportion of difo component are used as softeners, textile auxiliary agents, binders in cosmetic preparations, flotating agents, binders in finely distributed materials, for example, for binding ceramic pigments, or lubricants.

The following examples serve to illustrate the invention but they are not intended to limit it thereto, the parts being by weight unless otherwise stated:

*Example 1*

80 parts molten trioxan were mixed with 1 part diethylene glycol formal. The melt was vigorously stirred, kept at 65° C. in a heating bath and 0.012 part borontrifluoride-diethyl etherate was added and polymerization set in at once. Stirring was continued until the batch had polymerized to a stiff magma, the stirrer was removed and the reaction mixture was allowed to stand in the reaction vessel for 10 hours at 65° C. until the polymerization was complete.

The solid block of polymer obtained was comminuted and finely ground. The powdered material obtained was then boiled for 1 hour with a mixture of 100 parts benzene and 250 parts methanol to which 2 parts ethanol amine had been added, then suction-filtered and repeatedly washed with methanol. The product so obtained was dried for 24 hours at 70° C. It underwent a loss in weight of 0.28% per minute at 202° C. The copolymer had a melting point of 170° C.

*Example 2*

80 parts molten trioxan were mixed with 5 parts diethylene glycol formal and 0.01 part para-nitro-phenyl diazonium fluoroborate was added. The catalyst dissolved immediately. The closed reaction vessel was then allowed to stand at 65° C. The polymerization set in after a short time. During polymerization, the batch solidified to a solid block of polymer.

In order to be worked up, the block was comminuted and finely ground. The resulting polymer powder was boiled for 1 hour with a mixture of 200 parts benzene and 100 parts methanol, then suction-filtered and repeatedly washed with benzene. The product so obtained was dried for 24 hours at 60° C. It underwent a loss in weight of 0.19% per minute at 202° C.

The polymer had a melting point of 165° C.

*Example 3*

0.03 part borontrifluoride-diphenylamine complex was added to a mixture of 250 parts molten trioxan and 30 parts diethylene glycol formal. The catalyst dissolved immediately. The closed reaction vessel was allowed to stand at 65° C. After a short time, polymerization set in during which the batch solidiffied to a solid block of polymer.

In order to be worked up, the block was comminuted and finely ground and the resulting white polymer powder was boiled for one hour with a mixture of 700 parts benzene and 160 parts methanol, then suction-filtered and repeatedly washed with benzene. The product obtained was dried for 30 hours at 70° C. It underwent a loss in weight of 0.10% per minute at 202° C. The polymerization of pure trioxan, i.e. without addition of diethylene glycol formal, led under the conditions used in this example to a polymer which underwent a loss in weight of 0.23% per minute at 202° C.

The copolymer obtained had a melting point of 162° C.

*Example 4*

0.2 part triethyloxonium fluoroborate was added to a mixture of 800 parts molten trioxan and 250 parts diethylene glycol formal. The catalyst dissolved immediately. The closed reaction vessel was allowed to stand at 65° C. After a short time, polymerization set in during which the batch solidified to solid block of polymer.

In order to be processed, the block was comminuted and finely ground. The resulting polymer powder was boiled with a mixture of 2,000 parts benzene and 300 parts methanol, suction-filtered and repeatedly washed with methanol. The product obtained was dried for 20 hours at 50° C. in vacuo and then underwent a loss in weight of 0.07% per minute at 202° C. The copolymer had a melting point of 156° C.

*Example 5*

0.1 part m,m' - bis - trifluoro-methyl-phenyldiazonium-fluoroborate was added to a mixture of 400 parts molten trioxan and 250 parts diethylene glycol formal. After the catalyst had dissolved, the closed reaction vessel was allowed to stand at 65° C. After a short time, polymerization set in during which the batch solidified to a solid block of polymer.

In order to be processed, the block was comminuted and finely ground. The resulting polymer powder was boiled for 1 hour with a mixture of 1,000 parts benzene and 100 parts methanol, then suction-filtered and repeatedly washed with benzene. The product obtained was dried for 40 hours at 65° C. It underwent a loss in weight of 0.05% per minute at 202° C.

The copolymer had a melting point of 152° C.

*Example 6*

0.02 part para-nitrophenyl-diazonium fluoroborate was added to a mixture of 5 parts molten trioxan and 15 parts diethylene glycol formal. The fluoroborate dissolved rapidly. The batch was allowed to stand for 20 hours at 65° C. After that time, a colorless, thickly liquid oil which solidified to a wax-like white mass on standing was obtained.

The product so obtained underwent a loss in weight of 0.02% per minute at 202° C.

The polymer melted at 40–45° C. whereby a highly viscous and clear oil was obtained.

*Example 7*

A mixture of 100 parts molten trioxan and 1 part diethylene glycol formal was cooled and thereby caused to crystallize. The crystalline mass obtained was then charged with 0.009 part gaseous borontrifluoride in a vessel protected against the admission of atmospheric moisture, and the whole was heated for 3 hours at 80° C. After that time the mixture had polymerized without previous melting. The polymer which was obtained in the form of granules was finely ground and processed in the manner indicated in Example 1.

The dried product underwent a loss in weight of 0.18% per minute at 202° C.

*Example 8*

A mixture of 100 parts trioxan and 2.5 parts diethylene glycol formal was intimately mixed at room temperature with 0.015 part p-cyclohexyl-o-methyl-phenyldiazoinum fluoroborate. The reaction mixture so obtained was then heated for 3 hours at 85° C. After that time, the batch had polymerized without previous melting. The polymer so obtained was finely ground and then processed in the manner described in Example 1.

After processing, the product underwent a loss in weight of 0.15% per minute at 202° C.

*Example 9*

0.75 part gaseous borontrifluoride was introduced at —40° C. while stirring into a solution of 13 parts trioxan and 1 part diethylene glycol formal in 120 parts methylene chloride. Polymerization set in after 20 minutes. In the course of 7 hours during which the mixture was stirred and kept at a temperature of —40° C., a stiff magma of polymer was obtained. The reaction was then interrupted by the addition of 30 parts methanol. The polymer obtained was suction-filtered and washed twice with methanol. In order to be purified, the polymer was suspended three times in methanol, suction-filtered, washed, and then dried for 24 hours in vacuo at 60° C. The polymer underwent a loss in weight of 0.023% per minute at 202° C.

We claim:

1. In a process for the polymerization of trioxan in contact with at least one cationically active catalyst selected from the group consisting of boron trifluoride, tin tetrachloride, antimony pentachloride, etherates and amine complexes thereof, oxonium fluoroborates, aryl diazonium fluoroborates, and mixtures thereof, the improvement which comprises copolymerizing trioxan with diethylene glycol formal in contact with from 0.001 mol percent to 5 mol percent of said catalyst, calculated upon the monomer mixture, at a temperature from —100° C. to +150° C.

2. A process as defined in claim 1 wherein said copolymer is prepared from a mixture of trioxan and diethylene glycol formal containing from 1 to 50 percent by weight of diethylene glycol formal.

3. A process as defined in claim 1 wherein said catalyst is boron trifluoride.

4. A process as defined in claim 1 wherein said catalyst is tin tetrachloride.

5. A process as defined in claim 1 wherein said catalyst is antimony pentachloride.

6. A process as defined in claim 1 wherein said catalyst is an etherate complex.

7. A process as defined in claim 1 wherein said catalyst is an amine complex.

8. A process as defined in claim 1 wherein said catalyst is an oxonium fluoroborate.

9. A process as defined in claim 1 wherein said catalyst is an aryl diazonium fluoroborate.

10. A copolymer of trioxan and diethylene glycol formal consisting essentially of units, derived from said trioxan and diethylene glycol formal, corresponding to the formulas ($-O-CH_2-O-CH_2-O-CH_2-$) and ($-O-CH_2-O-CH_2-CH_2-O-CH_2-CH_2-$)

References Cited by the Examiner

UNITED STATES PATENTS

| 2,350,350 | 6/44 | Gresham | 260—67 |
| 2,475,610 | 7/49 | Gresham et al. | 260—338 |
| 2,989,511 | 6/61 | Schnizer | 260—67 |
| 3,027,352 | 3/62 | Walling et al. | 260—67 |

WILLIAM H. SHORT, *Primary Examiner.*

MILTON STERMAN, HAROLD N. BURSTEIN,
*Examiners.*